US012302051B2

(12) United States Patent
Marquez et al.

(10) Patent No.: US 12,302,051 B2
(45) Date of Patent: May 13, 2025

(54) LOW PROFILE ACOUSTIC MODULE

(71) Applicant: Logitech Europe S.A., Lausanne (CH)

(72) Inventors: Daniel Ryan Marquez, Vancouver, WA (US); WeiJen Cheng, Zhubei (TW); Hungl Wu, New Taipei (TW)

(73) Assignee: Logitech Europe S.A., Lausanne (CH)

( * ) Notice: Subject to any disclaimer, the term of this patent is extended or adjusted under 35 U.S.C. 154(b) by 126 days.

(21) Appl. No.: 18/139,877

(22) Filed: Apr. 26, 2023

(65) Prior Publication Data

US 2024/0365039 A1 Oct. 31, 2024

(51) Int. Cl.
*H04R 1/10* (2006.01)

(52) U.S. Cl.
CPC ......... *H04R 1/1008* (2013.01); *H04R 1/1058* (2013.01)

(58) Field of Classification Search
CPC ............................ H04R 1/1008; H04R 1/1058
See application file for complete search history.

(56) References Cited

U.S. PATENT DOCUMENTS

| | | | | |
|---|---|---|---|---|
| 2002/0015501 | A1* | 2/2002 | Sapiejewski | H04R 1/1083 381/372 |
| 2006/0269090 | A1* | 11/2006 | Sapiejewski | H04R 1/1083 381/371 |
| 2017/0006373 | A1* | 1/2017 | Bruss | H04R 1/2849 |
| 2017/0070807 | A1* | 3/2017 | Silvestri | H04R 1/2819 |
| 2017/0230744 | A1* | 8/2017 | Schrader | G10K 11/17855 |
| 2017/0272852 | A1* | 9/2017 | Kamada | H04R 1/1075 |
| 2018/0167735 | A1* | 6/2018 | Luzzato | B29C 45/0001 |
| 2018/0310090 | A1* | 10/2018 | Wen | H04R 5/033 |
| 2019/0052966 | A1* | 2/2019 | Hara | H04R 1/2811 |
| 2019/0313179 | A1* | 10/2019 | Saule | H04R 19/02 |
| 2021/0099783 | A1* | 4/2021 | Lin | H04R 1/02 |
| 2021/0099784 | A1* | 4/2021 | Lin | H04R 1/2811 |
| 2021/0105555 | A1* | 4/2021 | Shen | H04R 1/2849 |
| 2021/0337294 | A1* | 10/2021 | Dory | H04R 1/1008 |
| 2022/0103931 | A1* | 3/2022 | Hansen | H04R 1/1083 |
| 2022/0360888 | A1* | 11/2022 | Zhang | H04R 1/345 |
| 2022/0394387 | A1* | 12/2022 | Thune | H04R 5/0335 |
| 2023/0009102 | A1* | 1/2023 | Wang | H04R 1/40 |
| 2023/0111069 | A1* | 4/2023 | Wang | H04R 1/023 381/150 |
| 2023/0345161 | A1* | 10/2023 | Jou | G01S 17/04 |

* cited by examiner

*Primary Examiner* — Oyesola C Ojo
(74) *Attorney, Agent, or Firm* — Patterson & Sheridan LLP

(57) ABSTRACT

A low profile acoustic module is described. Embodiments include a headset acoustic module having first and second chambers. The first chamber has a side wall and first portion of a back wall, and defining a first volume. The side wall defines an opening sized to retain a speaker, and the first chamber defines a first volume. The second chamber is adjacent the first chamber, and comprises an inner wall, a front wall, and a second portion of the back wall, and defining a second volume greater than the first volume. The second volume is fluidly coupled to the first volume via a first set of vents on the inner wall, the second volume is fluidly coupled to an ambient atmosphere via a second set of vents, and the inner wall comprises at least a portion of the side wall.

33 Claims, 7 Drawing Sheets

LOW PROFILE ACOUSTIC MODULE

BACKGROUND

Field

Embodiments of the present disclosure generally relate to a low profile acoustic module and, more particularly, to a headset acoustic module having a dual-chamber concentric design.

Description of the Related Art

Headphones, also referred to as headsets, are a type of audio device that are worn over the ears to listen to audio privately. They typically consist of two earcups connected by a headband that rests over a portion of a user's head. The earcups contain speakers that deliver sound directly into the user's ears. Headphones can be wired or wireless, and they may include features like noise-cancellation technology, microphones for making phone calls or communicating through a computer or gaming console, touch controls for adjusting volume or skipping tracks, and more. Some headphones are designed for specific use cases, such as gaming or studio recording, and may have unique features to accommodate those needs. Headphones can be used with a variety of devices, including smartphones, tablets, laptops, personal computers, gaming consoles, and audio players, and they come in a range of styles and price points to suit different preferences and budgets.

Headphones, and in particular over-ear headphones, may be bulky and relatively heavy. Small profile headphones can be desirable for several reasons. Small profile headphones are generally more portable than larger ones, making them easier to carry around in a pocket or bag. Smaller profile headphones can be lighter and more comfortable to wear, especially for long periods of time because they are less likely to press on a user's ears or head, which can cause discomfort or even pain. Smaller profile headphones can also be lighter, more discreet and less visually noticeable on a user and thus more appealing than larger profile headphones. Smaller profile headphones are more likely to be compatible with a wider range of devices, making them more versatile.

While smaller and lighter headphones may be desirable, reducing the ear cup size may have a negative effect on audio performance. In particular, bass performance is generally compromised by using a smaller ear cup size. The headphone's enclosure immediately behind the audio driver (speaker) has a significant impact on the audio performance. In order to reduce the ear cup size, the audio volume of this enclosure is typically shared with other components of the headphones, for example the enclosure may also include batteries, printed circuit boards (PCBs), and other electronic components which will affect the audio performance. Moreover, where the other components are different between left and right ear cups of a set of headphones, there will be different audio performance between left and right ear cups. This asymmetry can cause an undesirable mismatched audio performance between the left and right ear cups. In particular, the greater the asymmetry, the worse the audio mismatch and resultant poor audio performance that a user will experience during use.

Certain techniques to mitigate the audio mismatch have been attempted, but may be undesirable. For example, between the left and right ear cups, different acoustic seals, materials (e.g., foams), or acoustic porting may be used to reduce the asymmetry and improve audio performance. However, such techniques are costly in time and engineering resources. For example, even small changes in components that are includes in an ear cup may change the audio performance.

As such, low-profile headphones that maintain good audio performance are desired. Therefore, there is need for low profile headphones that solves the problems described above.

SUMMARY

Described herein is a low profile acoustic module and, more particularly, a headset acoustic module having a dual-chamber concentric design.

One or more embodiments herein include a headset. The headset includes a pair of speakers, a pair of headset acoustic modules, and a headband coupling a first headset acoustic module of the pair of headset acoustic modules to a second headset acoustic module of the pair of headset acoustic modules. Each headset acoustic module includes a first chamber that includes a side wall and a first portion of a back wall and defining a first volume. The side wall defines an opening that retains one of the pair of speakers, and the first chamber defines a first volume. Each headset acoustic module also includes a second chamber comprising an inner wall, a front wall, and a second portion of the back wall and defining a second volume greater than the first volume. The second volume is fluidly coupled to the first volume via a first set of one or more vents on the inner wall, the second volume is fluidly coupled to an ambient atmosphere via a second set of one or more vents, and the inner wall comprises at least a portion of the side wall of the first chamber.

One or more embodiments herein include a headset acoustic module. The headset acoustic module includes a first chamber comprising a side wall and a first portion of a back wall, and defining a first volume, wherein the side wall defines an opening sized to retain a speaker, and the first chamber defines a first volume. The headset acoustic module also includes a second chamber adjacent the first chamber, the second chamber comprising an inner wall, a front wall, and a second portion of the back wall and defining a second volume greater than the first volume, wherein the second volume is fluidly coupled to the first volume via a first set of one or more vents on the inner wall, the second volume is fluidly coupled to an ambient atmosphere via a second set of one or more vents, and the inner wall comprises at least a portion of the side wall of the first chamber.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1:
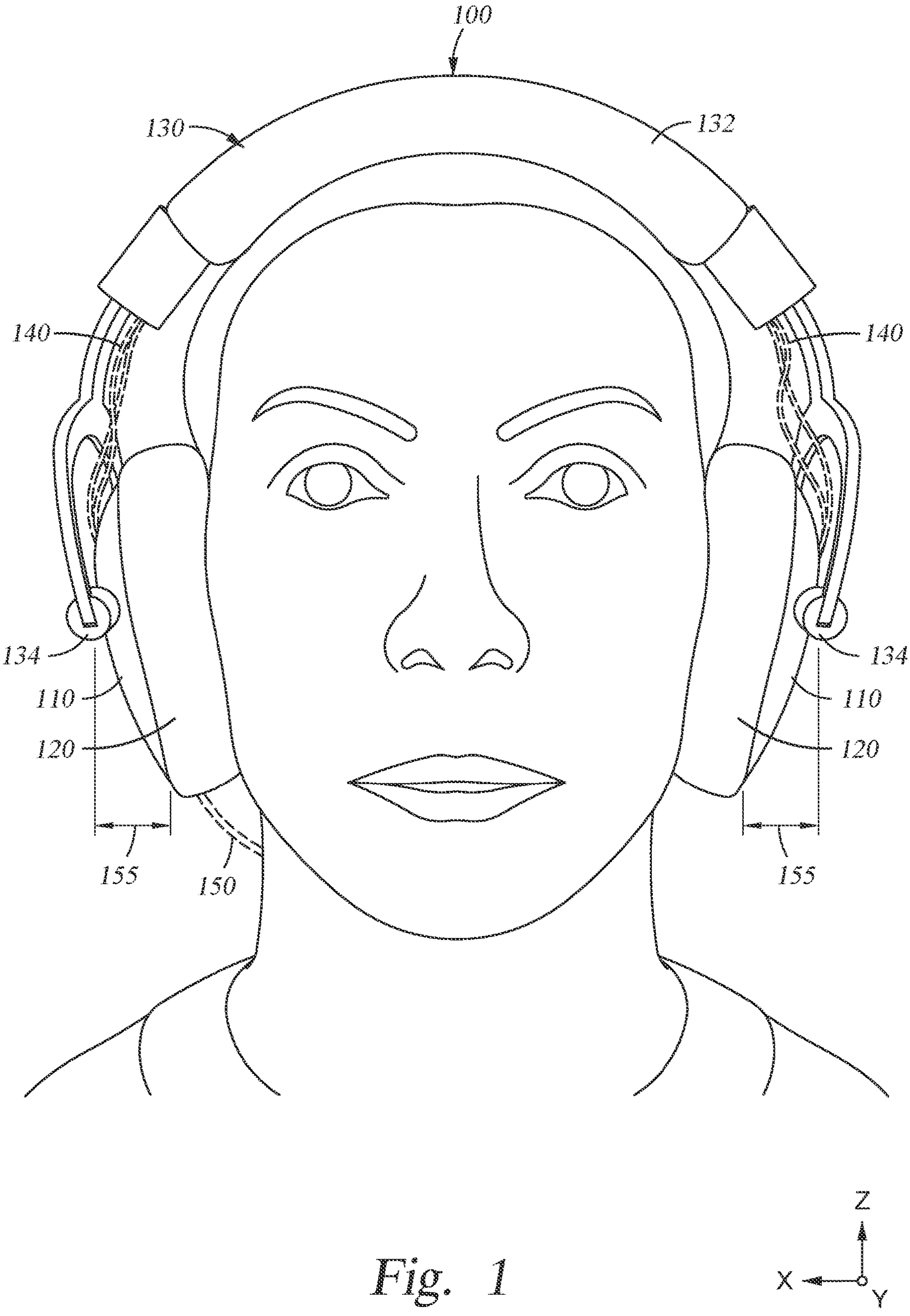
FIG. 1 is an illustration of an example of a headset worn by a user, according to one or more embodiments.

Embodiments of the present disclosure generally relate to a low profile acoustic module and, more particularly, to a headset acoustic module having a dual-chamber design. Embodiments of the present disclosure isolate the electronic components of the headset from the volumes of the dual chambers of the acoustic module, and utilize a high acoustic impedance load driver. Embodiments of the present disclosure have been developed to reduce the size of the headset and improve the audio performance. In one or more embodiments, each acoustic module, which may also be referred to as a headset acoustic module, of the left and right sides of the headset acoustic module are symmetric. The acoustic modules are substantially the same size acoustically, which may remove or substantially minimize the cause of left-right audio performance mismatch. In some embodiments, the left side acoustic module has two chambers that are symmetric with the two chambers of the right side, and are isolated from electronic components (e.g., batteries, printed circuit boards (PCBs), circuits) of the headphones.

Additionally, the embodiments of the present disclosure include a lower-profile acoustic module. A first, inner chamber of the acoustic module is positioned generally behind a face of the speaker (driver). As will be discussed further below, the inner chamber disclosed herein is generally configured to enhance the higher frequency performance of the lower-profile acoustic module over conventional headphone assembly designs due to the configuration and its position relative to the other chambers within the lower-profile acoustic module. A second, outer chamber of the acoustic module is fluidly connected to the inner chamber via a set of one or more ports, and includes a volume that generally surrounds the inner chamber and is generally configured to enhance the lower frequency performance of the lower-profile acoustic module due to its configuration and its position relative to the other chambers within the lower-profile acoustic module.

According to the lower-profile design of the present disclosure, the outer chamber generally shares a side wall with the inner chamber, but does not share the back wall of the inner chamber, where the back wall of the inner chamber is roughly parallel to but opposite the face of the driver (speaker). In one or more embodiments, the outer chamber may define a volume that forms an annulus around the inner chamber. For example, the side walls of the inner chamber may be roughly concentric with the side walls of the outer chamber, where the inner chamber and outer chamber may be considered roughly as short, concentric cylinders (where the diameter of the cylinder is greater than the height of the cylinder). In another example, the inner chamber is circular in shape and the outer chamber defines a volume that forms an annulus around the circular shaped inner chamber. In other embodiments, the volume of the outer chamber may define a volume that partially surrounds the inner chamber, and does not share the back wall of the inner chamber. For example, the outer chamber may be roughly a "C" shape with the inner chamber within the "C" where the opening of the "C" may face any orientation, including a direction that is up, down, left, or right relative to a direction that is perpendicular to driver's movement direction or parallel to the back wall of the inner chamber. In still other embodiments, the outer chamber may be adjacent to the inner chamber, but not wrapping around or only partially surrounding the inner chamber.

One or more embodiments of the present disclosure use a high acoustic impedance load driver. A high acoustic impedance load driver has a driver having a relatively large motor strength (e.g., large for a headset having a same or similarly-dimensioned driver), and a relatively light diaphragm. In one or more embodiments, the diaphragm is light and stiff and the driver has a relatively large motor strength. In some embodiments, the driver is a high acoustic impedance load driver and includes a two-part diaphragm: a first portion being a relatively rigid driver diaphragm and a second portion being a flexible surround. In some examples, a high acoustic impedance load driver with such a two-part diaphragm can operate with relatively less acoustic distortion than the high acoustic impedance load driver with a single-part diaphragm. In one or more embodiments, a high acoustic impedance load driver is characterized by having a diaphragm of 25 millimeters or greater, a motor strength of 0.15 square newton per watt or greater, and normalized acceleration factor of 500 newton per kilogram or greater.

According to one or more embodiments, the inner and outer chambers together may maintain dimensions that are measured parallel to a side of a typical user's head (e.g., region surrounding a user's ear), such that the dimensions are approximately consistent with existing over-ear headset designs. In some embodiments, while the ear cup size and dimension are approximately the same, the thickness or depth (e.g., depth 155 in FIG. 1) of the acoustic module is reduced while maintaining or improving the audio characteristics and performance of the lower-profile acoustic module, wherein the thickness or depth of the acoustic module is measure in a direction perpendicular to the side of a user's head.

In one or more embodiments, while it is commonly believed in the art that reducing depth of acoustic module will detrimentally effect the performance of a headphone device, the acoustic module design described herein is at least configured to maintain similar performance (e.g., the same or similar frequency response) for a given frequency range, or provide increased performance for a same frequency or frequency range versus conventional headphone designs. For example, one or more embodiments maintain about the same mid-frequency range and high-frequency range performance, and improve low-frequency range performance (bass). However, it has been found that by configuring the acoustic module as described herein, the a frequency response at a maximum output can be improved and/or increased across some or all of low-, mid-, and high-frequency ranges. In some embodiments, a distortion at a maximum output is reduced across some or all of low-, mid-, and high-frequency ranges. In one or more embodiments, at a maximum output of the headset according to the acoustic module design described herein, both frequency response is increased and distortion is decreased across some or all of low-, mid-, and high-frequency ranges.

In one or more embodiments, the left and right sides of headset are matched, for example audio performance between left and right sides of the headset are the same or substantially the same.

In one or more embodiments, for a given audio output level, the power consumption of a headset utilizing the acoustic module design described herein uses less power under the same or substantially similar conditions. For example, it has been found that the acoustic module design described herein can use less than about 0.04 milliwatts at 90 db SPL using a reference audio input.

FIG. 1 is an illustration of a headset 100 worn by a user, according to one or more embodiments. On the right side, headset 100 includes a first (right) acoustic module 110 and a first of ear cushion 120. On the left side, headset 100 includes second (left) acoustic module 110 and a second of ear cushion 120. A headband 130 connects the acoustic module 110 of the left side with the acoustic module 110 of the right side. Headband 130 includes a cushion 132 to rest on and support the headset on the top of the user's head and two sets of rotatable connector portions 134 to flexibly couple the headband 130 with the acoustic modules 110.

One or more embodiments include an optional wired configuration, where a first electrical connection 140 (e.g., a speaker wire including two conductors) provides an electrical connection between the left and right sides of the headset 100, while second electrical connection 150 (e.g., a speaker wire including at least three conductors) provides an electrical connection to an audio signal source, such as a computer, smartphone, tablet, gaming controller, or other similar audio signal transmitting device.

One or more embodiments include a wireless (or wired) configuration, where a third chamber (e.g., third chamber 440 in FIG. 4) that houses electronics is part of or connected to adjacent the acoustic modules 110.

Figure 2A:
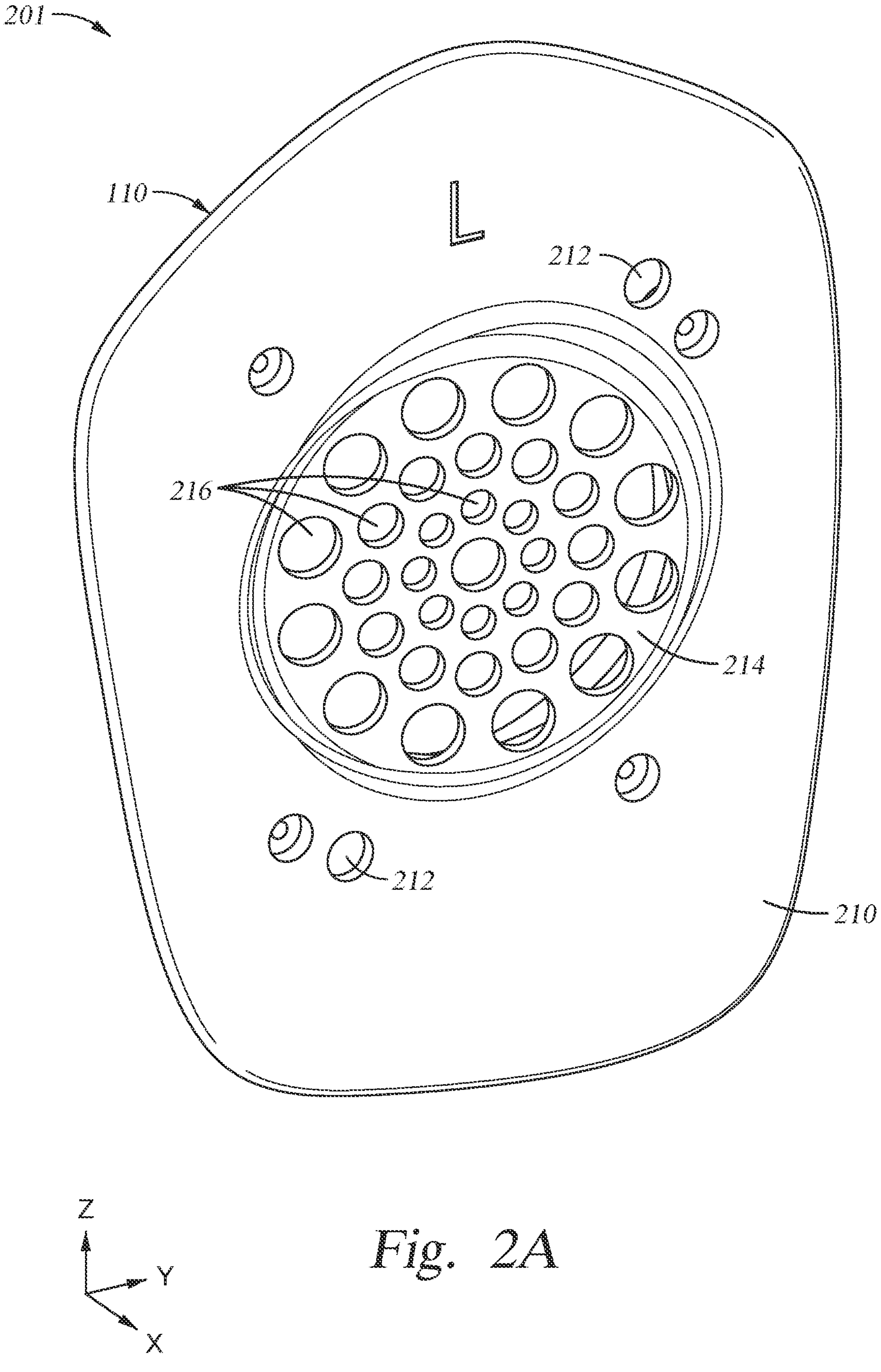
FIG. 2A is a perspective view of an example of an acoustic module of a headset, according to one or more embodiments.
Figure 2B:
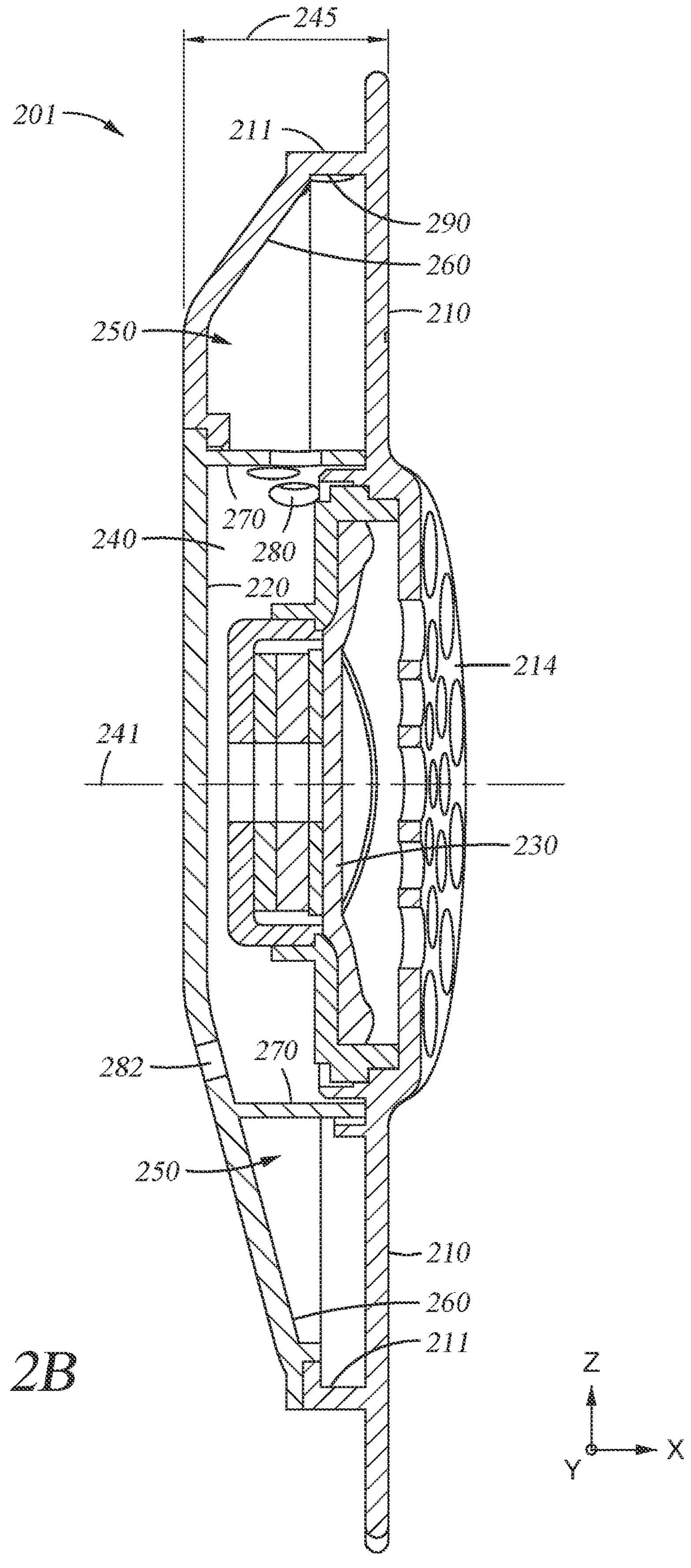
FIG. 2B is a side cross-sectional view of an example of an acoustic module of a headset, according to one or more embodiments.

FIG. 2A is a perspective view 201 of an example of front face of an acoustic module 110 of a headset 100, according to one or more embodiments. FIG. 2B is a side cross-sectional view 202 of the example of the acoustic module 110 shown in perspective view 201, according to one or more embodiments.

A first, inner chamber 240 of the acoustic module 110 includes a back wall 220 and side walls 270. Acoustic module 110 can retain an audio driver 230, that may also be referred to as a speaker, as shown in FIG. 2B. The audio driver 230 is retained (held, secured, or otherwise fixed) at a front portion of the inner chamber 240 of the acoustic module 110 to fill, partially or entirely, an opening of the inner chamber 240 at the front portion of the inner chamber 240. In one or more embodiments, the opening is a constant or approximately constant radius circular opening. In other embodiments, the opening may be another shape, such as elliptical or ovular, to receive, fix, and support an audio driver 230 that has a corresponding shape, such as elliptical or ovular shape. The audio driver 230 can be retained at or by the side walls 270. The inner chamber 240 includes a first volume that is substantially defined by the rear surface of the audio driver 230, side walls 270, and back wall 220. As used herein, the term "first volume" includes the void or unobstructed volume (e.g., actual volume of air) within the inner chamber 240.

A second, outer chamber 250 of the acoustic module 110 includes a back wall 260, outer edge wall 211, side walls 270, and a front wall of front plate 210. The side walls 270 may also be referred to herein as the inner walls or inner side walls with reference to the outer chamber 250, and side walls or outer side walls with reference to the inner chamber 240. In one or more embodiments, the back wall 260 may be at least partially co-planar with the back wall 220. In one or more embodiments, the back wall 260 at least partially curves toward or is angled toward the front plate 210, such that back wall 260 has some attributes of a back wall and some attributes of a side wall for the outer chamber 250. The outer chamber 250 includes a second volume that is substantially defined by the back wall 260, the side wall 270, and an outer portion of the front plate 210 that is extends between the side wall 270 and the back wall 260. As used herein, the term "second volume" includes the void or unobstructed volume (e.g., actual volume of air) within the outer chamber 250.

In one or more embodiments, the outer chamber 250 forms an annulus around the inner chamber 240. In one or more embodiments, the outer chamber 250 forms a partial annulus around the inner chamber 240 that includes the portion of the side wall 270 of the inner chamber 240. In one or more embodiments, the outer volume 250 is substantially positioned in a direction that is radially outward from a central axis 241 of the inner chamber 240. In some embodiments, the central axis 241 passes through a center of the inner chamber 240. In some cases, as shown in FIG. 2B, the central axis 241 is collinear with a central axis of the audio driver 230.

In one or more embodiments, a ratio between the second volume and the first volume is less than about 6:1. In one or more embodiments, the ratio between the second volume of the outer chamber 250 and the first volume of the inner chamber 240 is in the range from about 5:1 to about 4:1. Having a relatively low ratio between the second volume of the outer chamber 250 and the first volume of the inner chamber 240 while maintaining good bass performance with low distortion levels (and high overall audio quality), as further discussed herein, results in a relatively smaller and lighter headset, for example improving user comfort.

In one or more embodiments, the first volume of the inner chamber 240 is greater than 6 cubic centimeters and less than 8 cubic centimeters and the second volume of the outer chamber 250 is greater than 25 cubic centimeters and less than 30 cubic centimeters. In one or more embodiments, a net acoustic volume of each headset acoustic module, including the first volume and the second volume, is equal to or less than 42 cubic centimeters, where the total net acoustic volume (system-level total net acoustic volume) is defined as the net acoustic volume of the first volume and second volume combined with the audio driver 230 mounted in place in the inner chamber 240. Having a low total net acoustic volume (for example in addition to or partly as a result of having a relatively low ration between the second volume and the first volume) while maintaining good bass performance with low distortion levels (and high overall audio quality), as further discussed herein, results in a relatively smaller and lighter headset, for example improving user comfort.

In one or more embodiments, the opening of the side wall 270 defined to retain the audio driver 230 (speaker) comprises a diameter of between about 40 millimeters and about 50 millimeters.

In one or more embodiments, acoustic module 110 includes a front plate 210 that is generally planar and defines a front wall of the outer chamber 250. In one or more embodiments, front plate 210 includes a speaker cover 214 that includes a set of speaker vents 216 to fluidly couple a volume in front of the audio driver 230 to the volume in front of the speaker cover 214. The speaker vents 216 may be arranged in any desirable configuration, such as in concentric circles of vents of increasing diameter with a central vent as illustrated in the embodiment of perspective view 201. In other embodiments, speaker vents have different sizes, shapes, arrangements or patterns, or quantity. In one or more embodiments, the surface of the speaker cover 214 is oriented approximately 10 to 20 degrees about a vertical axis to provide better alignment with users' ear canals. In some embodiments the speaker cover 214 is oriented approximately 15 degrees. In one or more embodiments, the audio driver 230 and the surface of the speaker cover 214 are both oriented approximately 10 to 20 degrees, such as 15 degrees relative to the vertical axis.

An outer portion toward the edge of the front plate 210 may be contoured (e.g., flat or smooth without substantial surface features, such as perforations) to provide a mounting surface for an ear cushion 120 (see FIG. 1). Ear cushion 120 may perform at least two functions, including providing a support to comfortably space the acoustic module away from a user's head, and sealing or partially sealing an external volume that is formed in front side (e.g., speaker cover 214 side) of the driver 230 and the side of the user's head, and includes at least a portion of the user's ear and isolates the at least a portion of the ear from the ambient environment.

In one or more embodiments, front plate 210 includes a set of one or more vents 212 (FIG. 2A) therethrough. The set of one or more vents 212 fluidly couple a volume of the outer chamber 250 to the portion of the external volume in front of the speaker cover 214. The set of one or more vents 212 may be arranged in any desirable configuration. Each vent of the one or more vents 212 may have a same size and shape, or may be differently shaped. In one or more embodiments the one or more vents 212 include multiple vents that are substantially round and the same size. In one or more embodiments, the one or more vents 212 are clustered in pairs or other groups on the front plate 210. In other embodiments, the vents of the one or more vents 212 are spread on the front plate 210, according to a regular distribution pattern. In other embodiments, the vents of the one or more vents 212 are distributed on the front plate 210, according to an irregular distribution pattern.

In one or more embodiments, side wall 270 has a set of one or more vents 280 extending therethrough. The set of one or more vents 280 fluidly couple the first volume defined by the inner chamber 240 to the second volume defined by the outer chamber 250. Each vent of the one or more vents 280 may have a same size and shape, or may be differently shaped. In one or more embodiments the one or more vents 280 include multiple vents that are substantially round and the same size. In one or more embodiments, the one or more vents 280 are clustered on a region of the side wall 270. In other embodiments, the vents of the one or more vents 280 are spread on the side wall 270 according to a regular distribution pattern. In other embodiments, the vents of the one or more vents 280 are spread on the side wall 270 according to an irregular distribution pattern. In one or more embodiments, the one or more vents 280 are substantially positioned in a group that is aligned in a direction (e.g., Z-direction in FIG. 3A) that is radially outward from a central axis 241 of the inner chamber 240. In one or more embodiments, the vents 280 are grouped within a quadrant defined between two orthogonal directions that extend radially outward from a central axis 241.

In one or more embodiments, back wall 260, outer edge wall 211, or both, has a set of one or more vents 290 therethrough. The set of one or more vents 280 fluidly couple the second volume defined by the outer chamber 250 to an ambient environment. Each vent of the one or more vents 290 may have a same size and shape, or may be differently shaped. In one or more embodiments the one or more vents 290 include multiple vents that are substantially round and the same size. In one or more embodiments, the one or more vents 290 are clustered on the back wall 260. In other embodiments, the vents of the one or more vents 290 are spread on the back wall 260, outer edge wall 211, or both, according to a regular distribution pattern. In other embodiments, the vents of the one or more vents 290 are spread on the back wall 260, outer edge wall 211, or both, according to an irregular distribution pattern.

The acoustic module 110 has a thickness 245 that is defined from the front plate 210 to the back wall 220 of the inner chamber 240. In one or more embodiments, the thickness 245 is about 12 millimeters to about 16 millimeters. In some embodiments, the thickness is 14 millimeters.

Figure 3A:
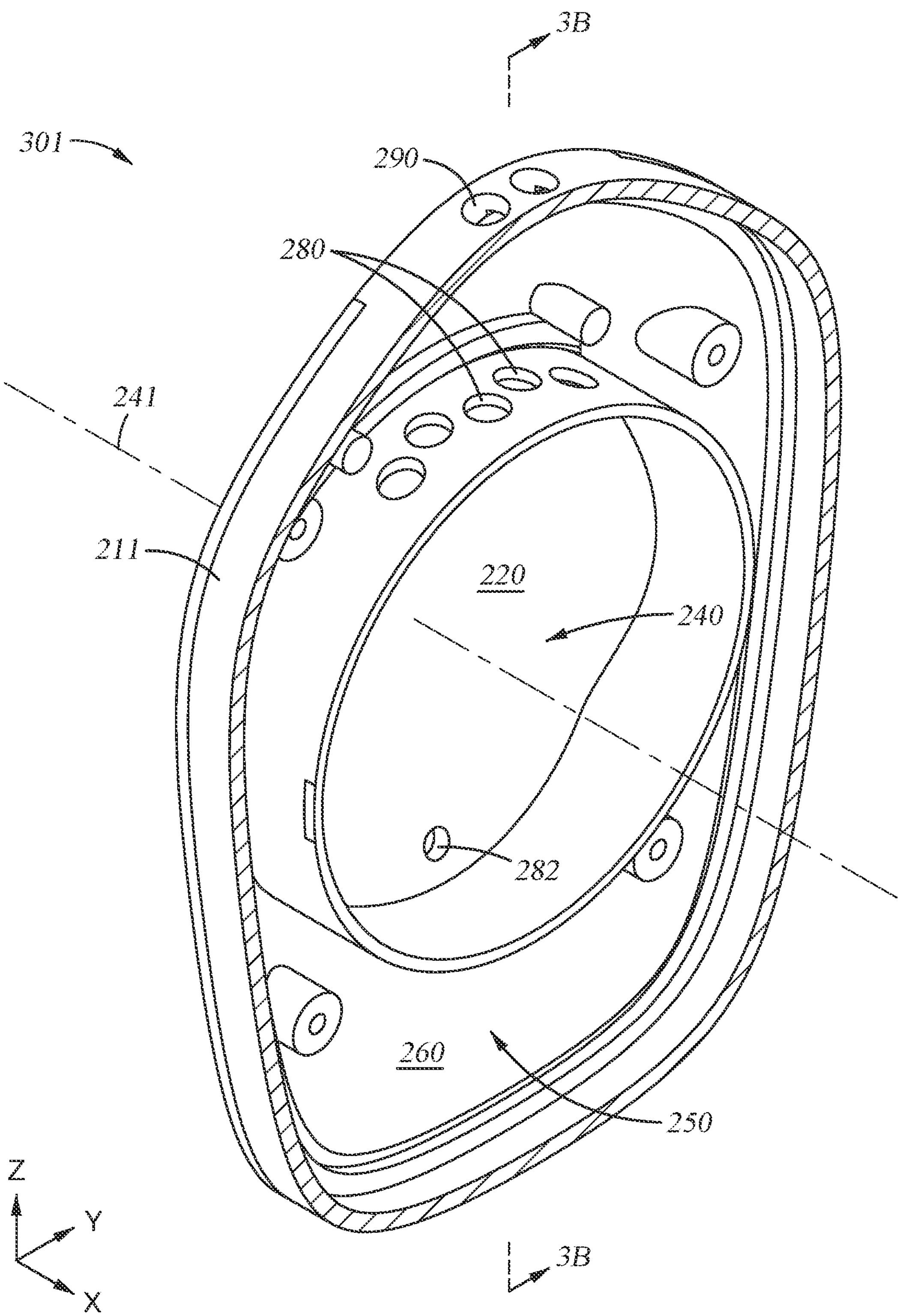
FIG. 3A is a perspective view of an example of a portion of an acoustic module of a headset, according to one or more embodiments.
Figure 3B:
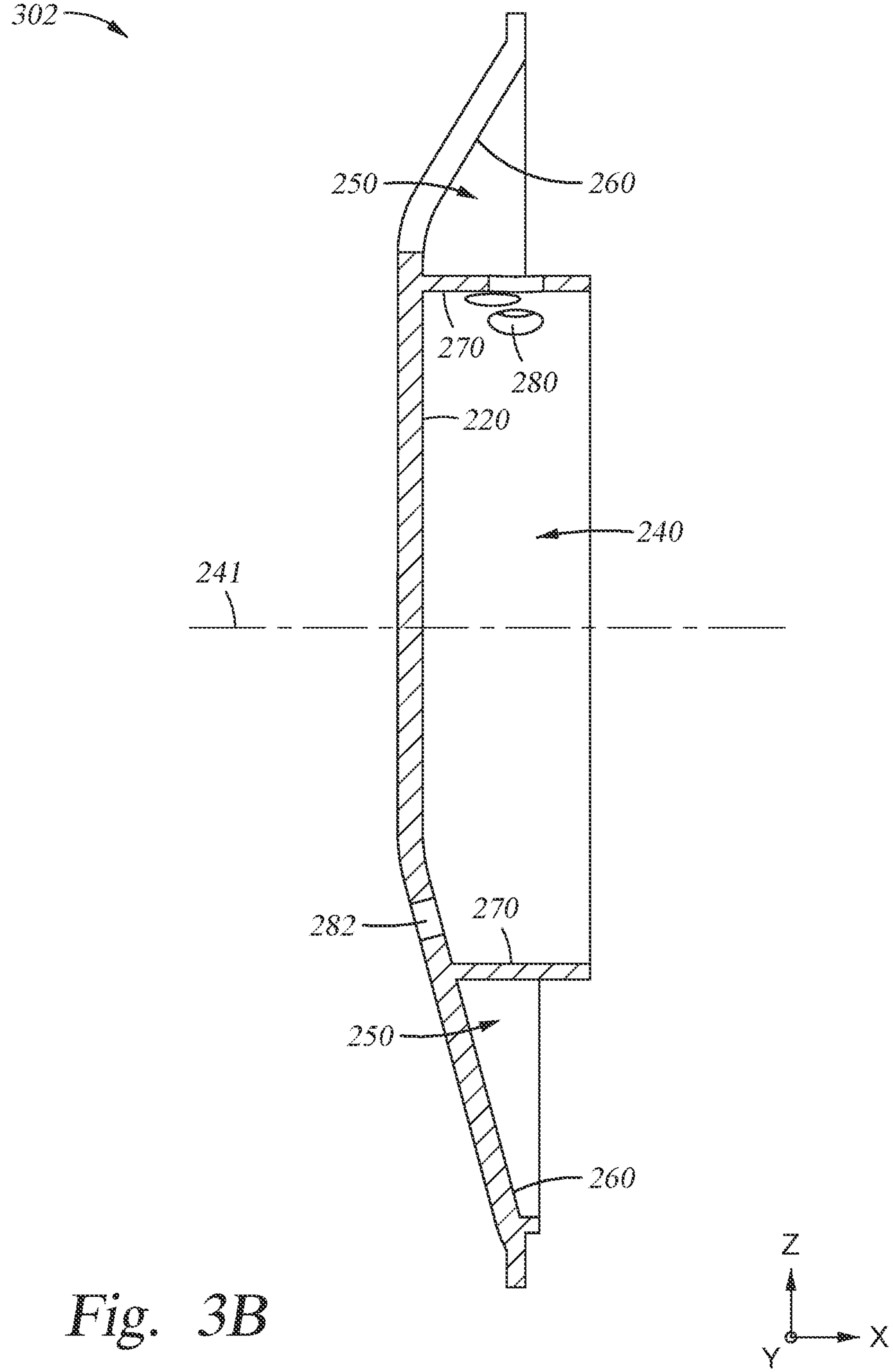
FIG. 3B is a side cross-sectional view of an example of a portion of an acoustic module of a headset, according to one or more embodiments.

FIG. 3A is a perspective view 301 of an example of a portion of an acoustic module 110 of a headset 100, according to one or more embodiments. FIG. 3B is a side cross-sectional view of an example of a portion of an acoustic module of a headset, according to one or more embodiments. For clarity, features previously described with reference to perspective view 201 and side cross-sectional view 202 are omitted. Also, perspective view 301 and side cross-sectional view 302 omit front plate 210 from acoustic module 110, other than outer edge wall 211 of front plate 210. In other embodiments, outer edge wall 211 is a separate component from front plate 210. In other embodiments, outer edge wall 211 is rigidly affixed to or integrated with the front plate 210.

As shown in perspective view 301, in one or more embodiments, acoustic module 110 may include a port 282 through which one or more electrical connections or wires (e.g., first electrical connection 140) may be run to provide an electrical connection to electrical contacts 550 (shown in FIG. 5B) of an audio driver 230. In some configurations, the port 282 is positioned on an opposing side of inner chamber 240 from the vents 280.

FIG. 3B is a side cross-sectional view 302 of another example of a portion of an acoustic module 110 of a headset 100, according to one or more embodiments. For clarity, features previously described with reference to perspective view 201, side cross-sectional view 202, perspective view 301, and side cross-sectional view 302 are omitted. Outer edge wall 211, which is visible in perspective view 301, is omitted in side cross-sectional view 302.

Figure 4:
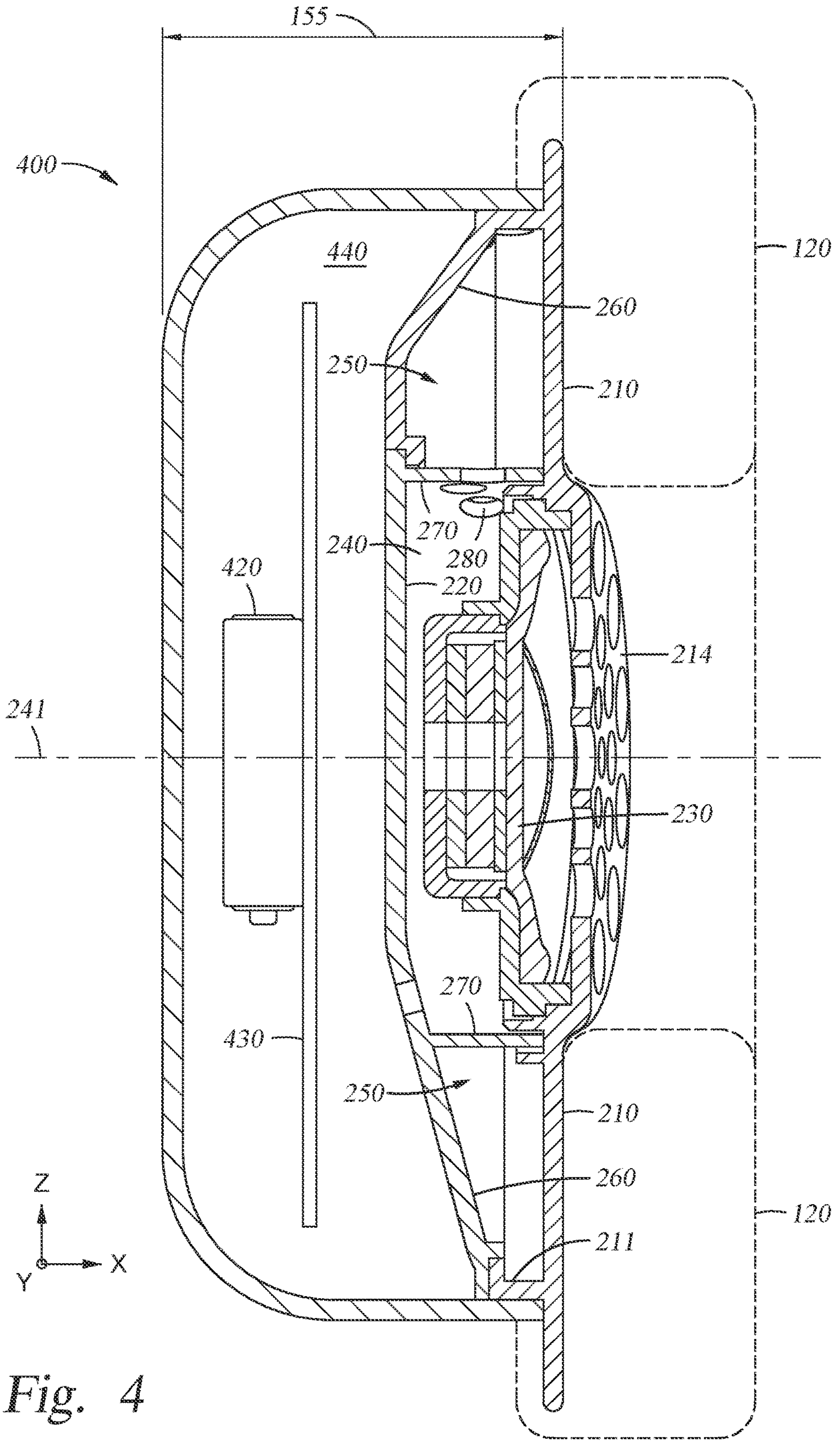
FIG. 4 is a side cross-sectional view of an example of an acoustic module of a headset, according to one or more embodiments.

FIG. 4 is a side cross-sectional view 400 of another example of an acoustic module 110 of a headset 100, according to one or more embodiments. Side cross-sectional view 400 includes an acoustic module 110, and a third chamber 440 to house electronics including at least one of the battery 420 and a headset printed wiring board 430 (which may also be or be referred to as a printed circuit board (PCB)). The headset printed wiring board 430, which may be multiple boards in some examples, includes various electrical components, for example components to drive the audio driver 230, or drivers (speakers), provide wired or wireless connectivity (e.g., using Bluetooth® or other wireless communications protocol), shape and amplify audio signals, control volume, or manage battery charging.

An enclosure 410, the back wall 220 of the inner chamber 240, and at least a part of the second portion of the back wall of the outer chamber 250 define the third chamber 440 having a third volume. The enclosure 410 may be acoustically isolated or substantially acoustically isolated from the inner chamber 240 and outer chamber 250. In one or more embodiments, one or more pass-through (e.g., port 282) may be provided to the inner chamber 240, outer chamber 250, or both, to provide one or more electrical connections, for example to provide an electrical connection between the headset printed wiring board 430 and audio driver 230 (e.g., the electrical connection coupled with or being first electrical connection 140 or second electrical connection 150). In one or more embodiments, the one or more pass-throughs are the only apertures between the third chamber 440 and the inner chamber 240, outer chamber 250, or both. In one or more embodiments, the pass-throughs (e.g., port 282) may be sealed around any electrical connection to prevent fluid coupling between the chambers.

In one or more embodiments, each of a left acoustic module 110 and a right acoustic module 110 of a headset 100 include a third chamber 440 of a same size. Because the inner chamber 240 and the outer chamber 250 do not include a battery 420, headset printed wiring board 430, or other electrical components (other than audio driver 230) in their volumes that are of a same size, the acoustic volume, and thus acoustic performance, are matched between the left acoustic module 110 and the right acoustic module 110. In one or more embodiments, the third chamber 440 of the left acoustic module 110 includes at least some electrical components different from the electrical components the third chamber 440 of the left acoustic module 110. At least because the sizes of the inner chamber 240 and outer chamber 250 are the same (or substantially the same) between the right and left acoustic modules 110, differenced in weight or components between the left and right sides of headset 100 are reduced or eliminated.

Figure 5A:
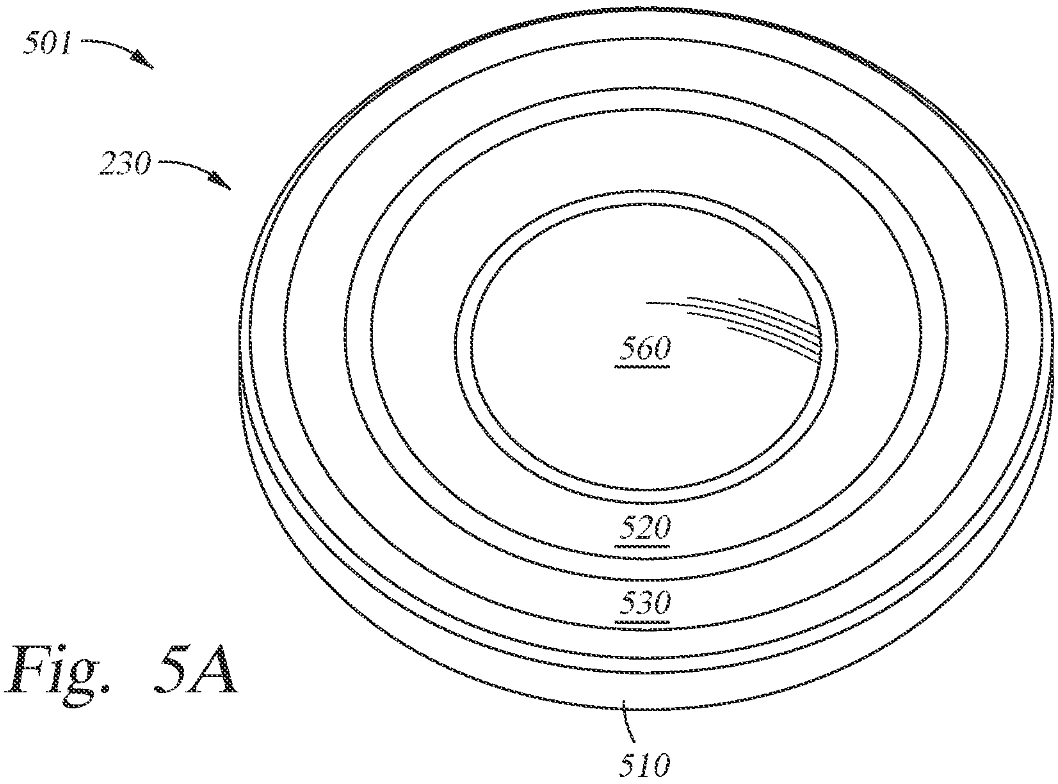
FIG. 5A is a front perspective view of an example of an audio driver of a headset, according to one or more embodiments.
Figure 5B:
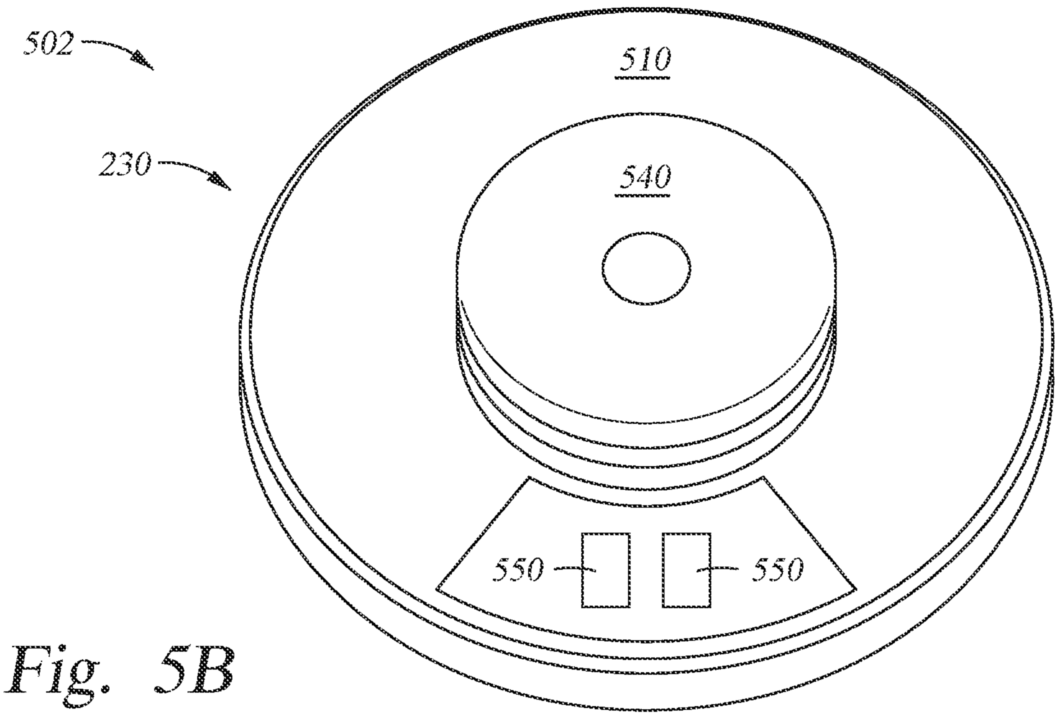
FIG. 5B is a back perspective view of an example of an audio driver of a headset, according to one or more embodiments.

FIG. 5A is a front perspective view 501 of an example of an audio driver 230 of a headset 100, according to one or more embodiments. FIG. 5B is a back perspective view 502 of the example of the audio driver 230. In one or more embodiments, the audio driver 230 is of a constant or approximately constant radius circular shape. In other embodiments, the audio driver 230 may be another shape, such as elliptical or ovular. Audio driver 230 may also be equivalently referred to herein as a speaker or driver, and a part of audio drivers 230 referred to as a pair of speakers or pair of drivers.

In one or more embodiments, each audio driver 230 (speaker) of a pair of audio drivers 230 (speakers) include a diaphragm having at least two different materials. In one or more embodiments, each audio driver 230 (speaker) of a pair of audio drivers 230 (speakers) include a diaphragm having a rigid or relatively rigid inner portion 520 and a flexible or relatively flexible (e.g., relative to the inner portion 520) outer portion 530. The flexible outer portion 530 of the diaphragm may also be referred to as a surround or flexible surround. The diaphragm may also be referred to as a driver diaphragm herein.

Audio driver 230 is dimensioned with a diameter to fit (be retained, fixed, set) within inner chamber 240 of an acoustic module 110, as further discussed herein. Audio driver 230 includes a diaphragm having an inner portion 520 that is stiff or relatively stiff compared to the same or similarly dimensioned headset drivers (speakers). In one or more embodiments, the diaphragm is graphene, but other materials may be used consistent with the disclosure herein.

Audio driver 230 also includes a flexible surround 530. The inner radius of flexible surround 530 is coupled with the outer radius of the diaphragm 520. While the diaphragm 520 is relatively stiff, flexible surround 530 is more flexible so that, when being driven, diaphragm 520 retains or substantially retains its shape while being driven along the axis perpendicular to the face of the audio driver 230. However, flexible surround 530 bends, warps, or flexes to provide diaphragm 520 with such movement. Flexible surround 530 may also be or be referred to as a suspension membrane.

Audio driver 230 includes a basket 510 on the back and outside of audio driver 230, opposite the flexible surround 530 and diaphragm 520. The basket 510 may also be or be referred to as a frame herein. The outer radius of flexible surround 530 is coupled with the basket 510. A front edge of basket 510 is visible in front perspective view 501, and basket 510 is more fully visible in back perspective view 502. Basket 510 may be formed of any suitable material (e.g., stiff or relatively stiff materials), such as a plastic, a composite, or a metal.

Back plate 540 is coupled with the basket 510. The back plate 540 houses and supports several internal components (not shown) of the audio driver 230, including a magnet, voice coil (wire coil), and suspension mechanism. Electrical contacts 550 provide an electrical connection to the voice coil. A dust cap 560 (which may be referred to as a dome) is adhered to the front of the diaphragm 520, covering the internal components, and protecting them from moisture, dust, and other debris. In one or more embodiments, the dust cap 560 is a same material as the diaphragm, for example graphene.

In one or more embodiments, the audio driver 230 has a motor strength of at least 0.15 $N^2/W$, where the motor strength is represented by equation 1:

$$\text{motor strength} = \frac{(BL)^2}{Re} \tag{1}$$

where B is the magnetic flux density in the air gap (in units of teslas (T)), L is the length of the voice coil in the gap (in units of meters (m)), and Re is the voice coil's direct current resistance (in units of ohms (Ω). The motor strength value is useful as a measure of how effectively the audio driver 230 can convert electrical power to force (e.g., in newtons) to rapidly move a diaphragm 520 during the generation of sound. The larger the motor strength value, for a particular drive mass (e.g., including diaphragm 520), the more capable the audio driver 230 is in rapidly adjusting the position of the diaphragm 520 during the generation of sound. However, for a given magnet size, the larger the motor strength value, the larger the physical size of the voice coil portion of the audio driver 230, the greater the weight of the audio driver 230, and/or the stronger the basket 510.

In one or more embodiments, the audio driver 230 has an acceleration factor of at least 500 N/kg, where the acceleration factor is normalized to 1 watt of electrical power, and the normalized acceleration factor is represented by equation 2:

$$\text{normalized acceleration factor} = \frac{(BL)}{Mms * \sqrt{Re}} \quad (2)$$

where B is the magnetic flux density in the air gap (in units of teslas (T)), L is the length of the voice coil in the gap (in units of meters (m)), Mms is the mechanical moving mass (in units of kilograms (kg)) and Re is the voice coil's direct current resistance (in units of ohms (Ω). The normalized acceleration factor is useful as a measure of the ability of the audio driver 230 to move a diaphragm 520 during the generation of sound by the audio driver 230 for a given mass. The normalized acceleration factor may indicate the performance of an audio driver in a headset (e.g., headset 100) where high sound quality and low weight may be important to a user or consumer of the headset. It has been found that audio drivers that have an acceleration factor of at least 500 N/kg have a desirable sound quality (e.g., low distortion) and have the desired effect of assuring that the weight of the audio driver is minimized and/or reduced to a desirable level.

In one or more embodiments, the magnet of audio driver 230 is of a larger size or strength than magnets of audio drivers 230 used for a same or substantially similar sized opening according to current techniques. In one or more embodiments, the magnet of audio driver 230 is a ferrite or ceramic magnet. In one or more embodiments, the magnet of audio driver 230 is a rare-earth magnet. In one or more embodiments, the magnet of the audio driver 230 is made of neodymium.

In one or more embodiments, audio driver 230 has an effective diaphragm diameter of at least 25 millimeters. In one or more embodiments, the effective diaphragm diameter is measured from the outside edge of the diaphragm/suspension membrane to outside edge of diaphragm/suspension membrane, such that the effective diaphragm diameter includes the diameter across the output portion 530 of the diaphragm (and including the inner portion 520 and dust cap 560 within the diameter).

In one or more embodiments, audio driver 230 has a physical motor depth of 12 millimeters or less. In one or more embodiments, the physical motor depth is measured from the front of the basket 510 (frame) to the back of the magnet of the audio driver 230. A relatively smaller physical motor depth (while maintaining the same or substantial the same audio performance) allows for a more compact design, lower weight, or both, for a headset.

In one or more embodiments, the total weight of the audio driver 230 is less than or equal to 21.0 grams. A relatively lighter audio driver 230 (while maintaining the same or substantial the same audio performance) allows for a lower weight for a headset, increasing user comfort and usability.

In one or more embodiments, audio driver 230 is capable of producing at least 0 decibels of a band-averaged sound pressure level (SPL) for a first frequency range of 20 hertz to 100 hertz relative to a band-averaged SPL for a second frequency range of 100 hertz to 1 kilohertz. In some embodiments, the first frequency range may include frequencies beyond the frequency range of 20 hertz to 100 hertz, or the second frequency range may include frequencies beyond the frequency range of 100 hertz to 1 kilohertz, or both. Producing at least 0 relative decibels of a band-averaged SPL provides for good bass performance with low distortion levels, improving overall audio quality.

In one or more embodiments, audio driver 230 is capable of producing the at least 0 relative decibels when audio driver 230 is assembled as part of a complete headset 100, including when worn by a user. In one or more embodiments, audio driver 230 is capable of producing the at least 0 relative decibels when audio driver 230 is assembled as part of a single acoustic module 110. In one or more embodiments, audio driver 230 is capable of producing the at least 0 relative decibels when measured on a head and torso simulator under normal operating conditions with a standard log chirp for a standard range of frequencies, such as 20 hertz to 20 kilohertz. Other frequency ranges may be used consistent with the disclosure herein. In some embodiments, the driver level or volume setting for the audio driver 230 is set to produce 100 decibels, for example according to the EN50332 loudness standard.

In one or more embodiments, audio driver 230 is capable of producing less than 10 percent total harmonic distortion for frequencies within a frequency range of 20 hertz to 20 kilohertz. In one or more embodiments, audio driver 230 is capable of producing less than 10 percent total harmonic distortion for frequencies within a frequency range that includes at least 20 hertz to 20 kilohertz.

In one example, each speaker of a pair of speakers within a headset has an effective diaphragm diameter of at least 25 millimeters, a motor strength of at least 0.15 newton squared per watt, and an acceleration factor of at least 500 newton per kilogram normalized to 1 watt. Each speaker of the pair of speakers within the headset can include a physical motor depth of equal to or less than 12 millimeters, has a weight equal to or less than 21 grams, or both. In some configurations, a ratio of the outer chamber 250 volume to the inner chamber 240 volume is less than 6:1, a net acoustic volume of each headset acoustic module, including the inner chamber 240 volume and the outer chamber 250 volume, is equal to or less than 42 cubic centimeters, or both. It has been found that, each speaker of the pair of speakers formed in the configuration provided herein can also be capable of producing at least 0 decibels of a first band-averaged sound pressure level for a first frequency range including at least 20 hertz to 100 hertz relative to a second band-averaged sound pressure level for a second frequency range including at least 100 hertz to 1 kilohertz, and is capable of producing less than 10 percent total harmonic distortion for frequencies within a third frequency range including at least 20 hertz to 20 kilohertz.

While the foregoing is directed to embodiments of the present disclosure, other and further embodiments of the disclosure may be devised without departing from the basic scope thereof, and the scope thereof is determined by the claims that follow.

What is claimed is:

1. A headset, comprising:

a pair of speakers;

a pair of headset acoustic modules, each headset acoustic module comprising:

a first chamber comprising a side wall and a first portion of a back wall and defining a first volume, wherein the side wall defines an opening that is configured to retain one of the pair of speakers; and a second chamber comprising the side wall, a front wall, and a second portion of the back wall and defining a second volume greater than the first volume, wherein the second volume is fluidly coupled to the first volume via a first set of one or more vents on the side wall, the second volume is fluidly coupled to an ambient atmosphere via a second set of one or more vents, wherein the second chamber at least partially surrounds and is concentric with the first chamber, and wherein the sidewall extends from the back wall to the front wall; and a headband coupling a first headset acoustic module of the pair of headset acoustic modules to a second headset acoustic module of the pair of headset acoustic modules.

2. The headset of claim 1, wherein the first volume for each headset acoustic module of the pair of headset acoustic modules are equal in size, and the second volume for each headset acoustic module of the pair of headset acoustic modules are equal in size.

3. The headset of claim 1, wherein each speaker of the pair of speakers comprises a diaphragm having a rigid inner portion and a flexible outer portion.

4. The headset of claim 3, wherein the rigid inner portion of the diaphragm comprises graphene.

5. The headset of claim 1, wherein the second chamber, which at least partially surrounds the first chamber, forms an annulus around the first chamber.

6. The headset of claim 1, wherein the second chamber, which at least partially surrounds the first chamber, forms a partial annulus around the first chamber.

7. The headset of claim 1, wherein a ratio between the second volume and the first volume is less than about 6:1.

8. The headset of claim 7, wherein the ratio between the second volume and the first volume is in a range from about 5:1 to about 4:1.

9. The headset of claim 1, wherein the first volume is greater than 6 cubic centimeters and less than 8 cubic centimeters and the second volume is greater than 25 cubic centimeters and less than 30 cubic centimeters.

10. The headset of claim 1, wherein the opening of the side wall defined to retain the one of the pair of speakers comprises a diameter of between about 40 millimeters and about 50 millimeters.

11. The headset of claim 1, wherein each headset acoustic module further comprises:

a third chamber comprising at least the first portion of the back wall of the first chamber and a port of the second portion of the back wall of the second chamber, wherein the third chamber is configured to support a battery and a headset printed wiring board configured to drive the one of the pair of speakers.

12. The headset of claim 1, wherein both the first chamber and the second chamber are exclusive of a headset printed wiring board configured to drive the one of the pair of speakers.

13. The headset of claim 1, wherein both the second chamber is positioned a distance in a first direction that extends from a central axis of the first chamber.

14. The headset of claim 1, wherein each speaker of the pair of speakers has an effective diaphragm diameter of at least 25 millimeters, a motor strength of at least 0.15 newton squared per watt, and an acceleration factor of at least 500 newton per kilogram normalized to 1 watt.

15. The headset of claim 1, wherein each speaker of the pair of speakers has a physical motor depth of equal to or less than 12 millimeters, has a weight equal to or less than 21 grams, or both.

16. The headset of claim 1, wherein a ratio of the second volume to the first volume is less than 6:1, a net acoustic volume of each headset acoustic module, including the first volume and the second volume, is equal to or less than 42 cubic centimeters, or both.

17. The headset of claim 1, wherein each speaker of the pair of speakers is capable of producing at least 0 decibels of a first band-averaged sound pressure level for a first frequency range including at least 20 hertz to 100 hertz relative to a second band-averaged sound pressure level for a second frequency range including at least 100 hertz to 1 kilohertz, and is capable of producing less than 10 percent total harmonic distortion for frequencies within a third frequency range including at least 20 hertz to 20 kilohertz.

18. A headset acoustic module, comprising:

a first chamber comprising a side wall and a first portion of a back wall that at least partially define a first volume, wherein the side wall defines an opening sized to retain a speaker; and a second chamber adjacent the first chamber, the second chamber comprising the side wall, a front wall, and a second portion of the back wall and defining a second volume greater than the first volume, wherein the second volume is fluidly coupled to the first volume via a first set of one or more vents formed within the side wall, the second volume is fluidly coupled to an ambient atmosphere via a second set of one or more vents, wherein the second chamber at least partially surrounds and is concentric with the first chamber, and wherein the sidewall extends from the back wall to the front wall.

19. The headset acoustic module of claim 18, wherein the second chamber, which at least partially surrounds the first chamber, forms an annulus around the first chamber.

20. The headset acoustic module of claim 18, wherein the second chamber, which at least partially surrounds the first chamber, forms a partial annulus around the first chamber.

21. The headset acoustic module of claim 18, wherein a ratio between the second volume and the first volume is in a range from about 5:1 to about 4:1.

22. The headset acoustic module of claim 18, wherein the first volume is greater than 6 cubic centimeters and less than 8 cubic centimeters and the second volume is greater than 25 cubic centimeters and less than 30 cubic centimeters.

23. The headset acoustic module of claim 18, wherein the opening of the side wall defined to retain the speaker comprises a diameter of between about 40 millimeters and 50 millimeters.

24. The headset acoustic module of claim 18, further comprising:

a third chamber comprising at least the first portion of the back wall of the first chamber and a part of the second portion of the back wall of the second chamber, wherein the third chamber is configured to support a battery and a printed wiring board configured to drive the speaker.

25. A headset, comprising:

a pair of speakers, each speaker of the pair of speakers having an effective diaphragm diameter of at least 25 millimeters, a motor strength of at least 0.15 newton squared per watt, and an acceleration factor of at least 500 newton per kilogram normalized to 1 watt;

a pair of headset acoustic modules, each headset acoustic module comprising a first chamber defining a first volume defined by a first portion of a back wall and side wall and retaining one of the pair of speakers, and a second chamber forming at least a partial annulus concentric around the first chamber, and defining a second volume defined by a second portion of the back wall, the side wall and a front wall, and that is fluidly coupled to the first volume, and wherein the sidewall extends from the back wall to the front wall; and a headband coupling a first headset acoustic module of the pair of headset acoustic modules to a second headset acoustic module of the pair of headset acoustic modules.

26. The headset of claim 25, wherein each speaker of the pair of speakers has a physical motor depth of equal to or less than 12 millimeters.

27. The headset of claim 25, wherein each speaker of the pair of speakers has a weight equal to or less than 21 grams.

28. The headset of claim 25, wherein each speaker of the pair of speakers is capable of producing at least 0 decibels of a first band-averaged sound pressure level for a first frequency range including at least 20 hertz to 100 hertz relative to a second band-averaged sound pressure level for a second frequency range including at least 100 hertz to 1 kilohertz, and is capable of producing less than 10 percent total harmonic distortion for frequencies within a third frequency range including at least 20 hertz to 20 kilohertz.

29. The headset of claim 25, wherein a ratio of the second volume to the first volume is less than 6:1.

30. The headset of claim 25, wherein a net acoustic volume of each headset acoustic module, including the first volume and the second volume, is equal to or less than 42 cubic centimeters.

31. A headset, comprising:

a pair of speakers, wherein each speaker of the pair of speakers is capable of producing at least 0 decibels of a first band-averaged sound pressure level for a first frequency range including at least 20 hertz to 100 hertz relative to a second band-averaged sound pressure level for a second frequency range including at least 100 hertz to 1 kilohertz, and is capable of producing less than 10 percent total harmonic distortion for frequencies within a third frequency range including at least 20 hertz to 20 kilohertz;

a pair of headset acoustic modules, each headset acoustic module comprising a first chamber comprising a side wall and a first portion of a back wall, the side wall configured to retain one of the pair of speakers; and a second chamber comprising the side wall, a front wall and a second portion of the back wall, and forming at least a partial annulus around, concentric with, and fluidly coupled to the first chamber, and wherein the sidewall extends from the back wall to the front wall; and a headband coupling a first headset acoustic module of the pair of headset acoustic modules to a second headset acoustic module of the pair of headset acoustic modules.

32. The headset of claim 31, wherein each speaker of the pair of speakers has an effective diaphragm diameter of at least 25 millimeters, a motor strength of at least 0.15 newton squared per watt, and an acceleration factor of at least 500 newton per kilogram normalized to 1 watt.

33. The headset of claim 31, wherein the first chamber defines a first volume and the second chamber defines a second volume, wherein a ratio of the second volume to the first volume is less than 6:1, and a net acoustic volume including the first volume and the second volume is equal to or less than 42 cubic centimeters.

* * * * *